(12) United States Patent
Mueller et al.

(10) Patent No.: US 8,335,605 B2
(45) Date of Patent: Dec. 18, 2012

(54) MOUNTAIN COMPENSATION FOR HYBRID VEHICLES

(75) Inventors: Jonas Mueller, Munich (DE); Oliver Schloen, Haar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 304 days.

(21) Appl. No.: 12/776,758

(22) Filed: May 10, 2010

(65) Prior Publication Data

US 2011/0130908 A1 Jun. 2, 2011

Related U.S. Application Data

(60) Provisional application No. 61/264,976, filed on Nov. 30, 2009.

(51) Int. Cl.
*B60L 11/00* (2006.01)

(52) U.S. Cl. ......................................................... 701/22

(58) Field of Classification Search .................... 701/22, 701/23, 25, 27
See application file for complete search history.

(56) References Cited

U.S. PATENT DOCUMENTS 5,778,326 A 7/1998 Moroto et al.
2002/0107618 A1 8/2002 Deguchi et al.
2011/0065548 A1* 3/2011 Yu et al. .......................... 477/203

FOREIGN PATENT DOCUMENTS

EP 0 829 389 A2 3/1998
EP 2 071 162 A1 6/2009

OTHER PUBLICATIONS

European Search Report dated Mar. 30, 2011 including partial English-language translation (Sixteen (16) pages).

* cited by examiner

*Primary Examiner* — Faye M. Fleming
(74) *Attorney, Agent, or Firm* — Crowell & Moring LLP

(57) ABSTRACT

A method for adjusting a preset desired state of charge of an electric energy accumulator of a vehicle, in particular a hybrid vehicle, while traveling uphill and downhill, determines whether the condition for a vehicle traveling uphill or downhill is met according to a preset decision logic. It also determines whether an actual state of charge of the energy accumulator lies within a preset range of the state of charge, and adjusts the desired state of charge according to a preset adjustment logic, if the condition for a vehicle traveling uphill or downhill is met, and the actual state of charge of the energy accumulator lies within the preset range of the state of charge.

15 Claims, 2 Drawing Sheets

MOUNTAIN COMPENSATION FOR HYBRID VEHICLES

CROSS-REFERENCE TO RELATED APPLICATIONS

This application claims the benefit under 35 U.S.C. §119 (e) of Provisional Application No. 61/264,976, filed Nov. 30, 2009, the contents of which are herein expressly incorporated by reference.

BACKGROUND AND SUMMARY OF THE INVENTION

The present invention relates to a method for adjusting a preset desired state of charge of an electric energy accumulator of a vehicle, in particular a hybrid vehicle, while traveling uphill and downhill.

Hybrid vehicles utilize a complex operating strategy, according to which the electronics control the operating states, in which the vehicle is driven purely by use of the internal combustion engine, the internal combustion engine with the assistance of the electric machine or optionally purely by use of the electric machine. In terms of the management level, the control of the state of charge for the electric energy accumulator is located "below" the operating strategy. In simple terms, a desired state of charge is determined (or rather defined) as the reference value, and the actual state of charge is adjusted on the basis of this desired state of charge.

The object of the invention is to provide a method for adjusting a preset desired state of charge of an electric energy accumulator of a vehicle while traveling uphill and downhill.

This object is achieved by a method for adjusting a preset desired state of charge of an electric energy accumulator of a vehicle, in particular a hybrid vehicle, while traveling uphill and downhill. The method includes the acts of: determining whether the condition for a vehicle traveling uphill or downhill is met according to a preset decision logic; determining whether an actual state of charge of the energy accumulator lies within a preset range of the state of charge; and adjusting the desired state of charge according to a preset adjustment logic, if (i) the condition for a vehicle traveling uphill or downhill is met, and (ii) the actual state of charge of the energy accumulator lies within the preset range of the state of charge. Advantageous embodiments and further developments of the invention are described herein.

The starting point of the invention is a method for adjusting a preset desired state of charge of an electric energy accumulator of a vehicle, in particular a hybrid vehicle, while traveling uphill and downhill.

The term "desired state of charge" refers to that state of charge, with respect to which the actual state of charge of the energy accumulator is to be adjusted. The actual state of charge can lie both below and also above the desired state of charge.

The term "energy accumulator" is to be given a broad interpretation. It comprises, in particular, batteries (or rather accumulators), as found in conventional vehicles, in hybrid vehicles or also in purely electric vehicles. However, the term "energy accumulator" is not restricted to batteries or accumulators, but also includes other kinds of electric energy accumulators, such as capacitors, in particular so-called "super-caps."

The above-introduced concept "hybrid vehicle" includes vehicles, the drive train of which exhibits an internal combustion engine and at least one electric motor that generates a boost. In this context it can involve so-called "full hybrids" as well as also so-called "mild hybrids." A "full hybrid" may be driven by choice purely by use of the internal combustion engine, the internal combustion engine with the assistance of the electric machine or purely by use of the electric machine, whereas a mild hybrid may be driven only by use of the internal combustion engine or, by choice, the internal combustion engine with the assistance of the electric machine.

In accordance with the invention, the desired state of charge should be adjusted while traveling uphill or downhill in such a manner that when the vehicle is traveling downhill, the energy accumulator is adequately capable of consuming energy—that is, the potential energy that is liberated during the downhill descent can actually be recuperated—that is, can be converted into electrical energy and can be stored in the energy accumulator.

Working on this basis, the control unit is configured such that, for example, on reaching a transitory altitude, sufficient charge capacity is reserved, so that during the subsequent downhill descent, the potential energy that is liberated can actually be recuperated. Expressed in simple terms, the desired state of charge should be adjusted, in such a manner that the actual state of charge of the energy accumulator in the region of the local maxima of a gradient profile is relatively small, so that then the energy that is liberated during the subsequent downhill descent can actually be recuperated.

According to the invention, the first step is to determine in accordance with a predefined decision logic whether for the purpose of the decision logic the condition for uphill travel or downhill travel is even satisfied. Furthermore, it is determined whether the actual state of charge of the energy accumulator lies within a predefined state of charge range. For example, a state of charge range can be defined between 40% and 70% of the maximum capacity of the energy accumulator. Such a range with a lower limit and an upper limit is typically specified as the main operating range for batteries, in particular accumulators, because operating the energy accumulator below the lower limit and/or above the upper limit of this range would significantly shorten the service life of the energy accumulator.

According to the invention, the desired state of charge is adjusted in accordance with the predefined adjustment logic, if the predefined adjustment logic detects that the condition for a vehicle traveling uphill or downhill is satisfied, and if, in addition, the actual state of charge of the energy accumulator lies within the preset range of the state of charge.

The invention provides that the desired state of charge is raised above a "normal" desired state of charge, if the condition for a vehicle traveling downhill is met. On the other hand, the desired state of charge is dropped below a "normal" desired state of charge, if the condition for a vehicle traveling uphill is met. The result of this logic is that there is an adequate charge capacity on hand during the downhill descent, in order to be able to convert the potential energy that is liberated during the downhill descent into electrical energy and to be able to store this energy in the energy accumulator.

The normal desired state of charge can lie, for example, in a range between 50% and 70%, preferably approximately 60% of the maximum capacity of the energy accumulator.

According to a further aspect of the invention, the gradient of the increase and/or decrease in the desired state of charge is a function of the inclination and/or the downward slope of the distance "last" covered—for example, a predefined traveled section of the road. Thus, for example, a section of road of several hundred meters or just a few kilometers can be considered.

A further aspect of the invention provides that the decision logic for determining whether the condition for a vehicle traveling uphill or downhill is met evaluates an altitude signal and/or inclination signal. In this case, it can involve an absolute altitude or inclination signal or also a relative altitude or inclination signal. The term "absolute" is defined as, for example, monitoring the altitude above the sea level. As an alternative, the altitude or rather the change in altitude since the last engine startup or the like could also be monitored. As an alternative, the absolute inclination or rather the absolute gradient of the distance covered can also be evaluated.

The absolute or relative altitude and/or inclination signal can be obtained, for example, by measuring the ambient air pressure. Modern vehicles with internal combustion engines are generally already equipped with an air pressure sensor, because the ambient air pressure is an important input parameter for controlling the fuel injection. Thus, it would be possible to use the air pressure or rather the "altitude signal" that is already present in the vehicle in any event.

As an alternative or in addition, an altitude signal could also be obtained from the data that are delivered by a navigation system that, for example, is permanently integrated into the vehicle.

As an alternative, an "inclination signal" could be determined from the rolling resistance moment—that is, from the drive torque and/or the vehicle acceleration that occurs during this drive torque, so that in this case, for example, an estimated and/or average vehicle weight can be used for the calculation. Then, an altitude signal could be derived from the wheel resistance integrated over the distance traveled.

As an alternative or in addition, a pitch angle—that is, the inclination angle of the vehicle with respect to the horizontal plane—could also be evaluated. From this evaluation, an inclination signal could be derived, from which in turn an altitude signal can be generated through integration.

According to a further aspect of the invention, a mean altitude gradient is formed from the absolute or relative altitude and/or inclination signal. At the same time, the time frame, during which this gradient is determined, can be freely adjusted. As a result, the altitude gradient represents the altitude differential, over which the vehicle was moved within the given time frame.

This can happen, for example, by forming a first signal and a second signal from the absolute or relative altitude and/or inclination signal. The first signal reflects the time based or distance based changes in the altitude and/or inclination in an unfiltered manner or in a slightly filtered manner. The second signal reflects the time based or distance based changes in the altitude and/or inclination in a more filtered manner than the first signal. In this context "more filtered" means that the actual changes in the inclination of the stretch of road, on which the vehicle is currently traveling, and/or the actual changes in the altitude of the vehicle, are reflected slightly attenuated or delayed in time in the second signal, whereas the changes in inclination and/or the changes in altitude are mapped in the first signal in a manner very much like the actual gradient profile of the road.

It can be provided that the condition for a vehicle traveling uphill and/or downhill is detected, only if the amount of the difference between the two signals exceeds a preset value.

An additional embodiment of the invention provides that the increase and/or decrease in the desired state of charge is a function of the amount of the difference between the two signals.

Furthermore, the invention includes a method for controlling the actual charge state of an electric energy accumulator of a vehicle. This method specifies the desired state of charge as the reference value that is determined according to the above-described method.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
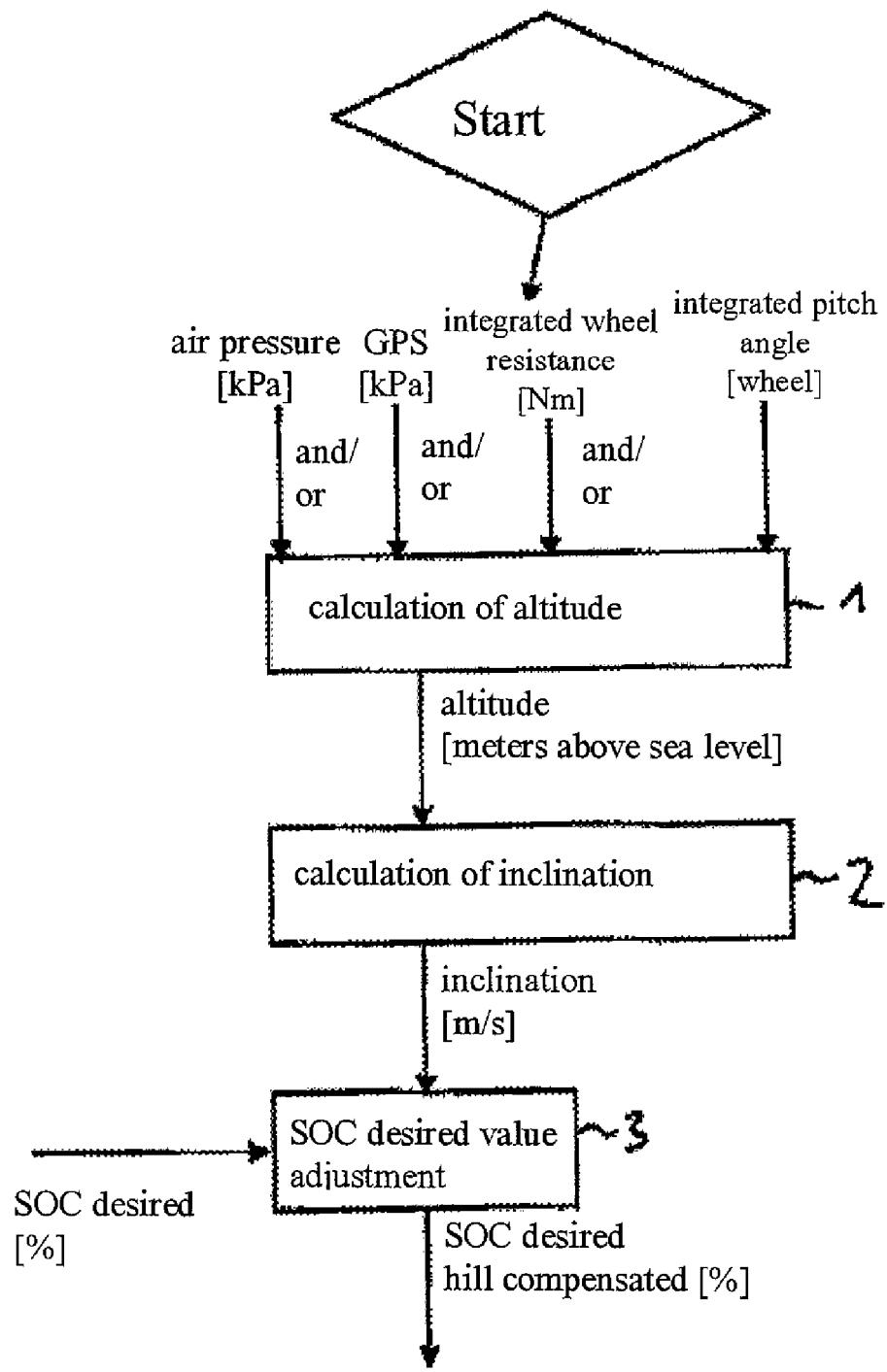
FIG. 1 is a schematic flowchart illustrating the principle idea underlying the adjustment of the desired state of charge of an energy accumulator while traveling uphill and/or downhill.

The starting point for adjusting the desired state of charge of an electric energy accumulator of a vehicle is an altitude and/or inclination signal. In the flowchart shown in FIG. 1, an altitude signal 1 is derived, for example, from a measured air pressure signal, from the data of a navigation system, from an integrated wheel resistance signal, from an integrated drive torque, and/or from an integrated inclination angle of the vehicle.

The gradient—that is, the derivation of the altitude signal 1 according to the stretch of road—produces an inclination signal 2, which reflects whether the vehicle is driving on a plane or on a road that continues to be flat, on a "stretch of hill" or a "stretch of downward slope." The latter is a key input parameter of the desired state of charge adjustment that is shown herein by block 3 in schematic form.

Figure 2:
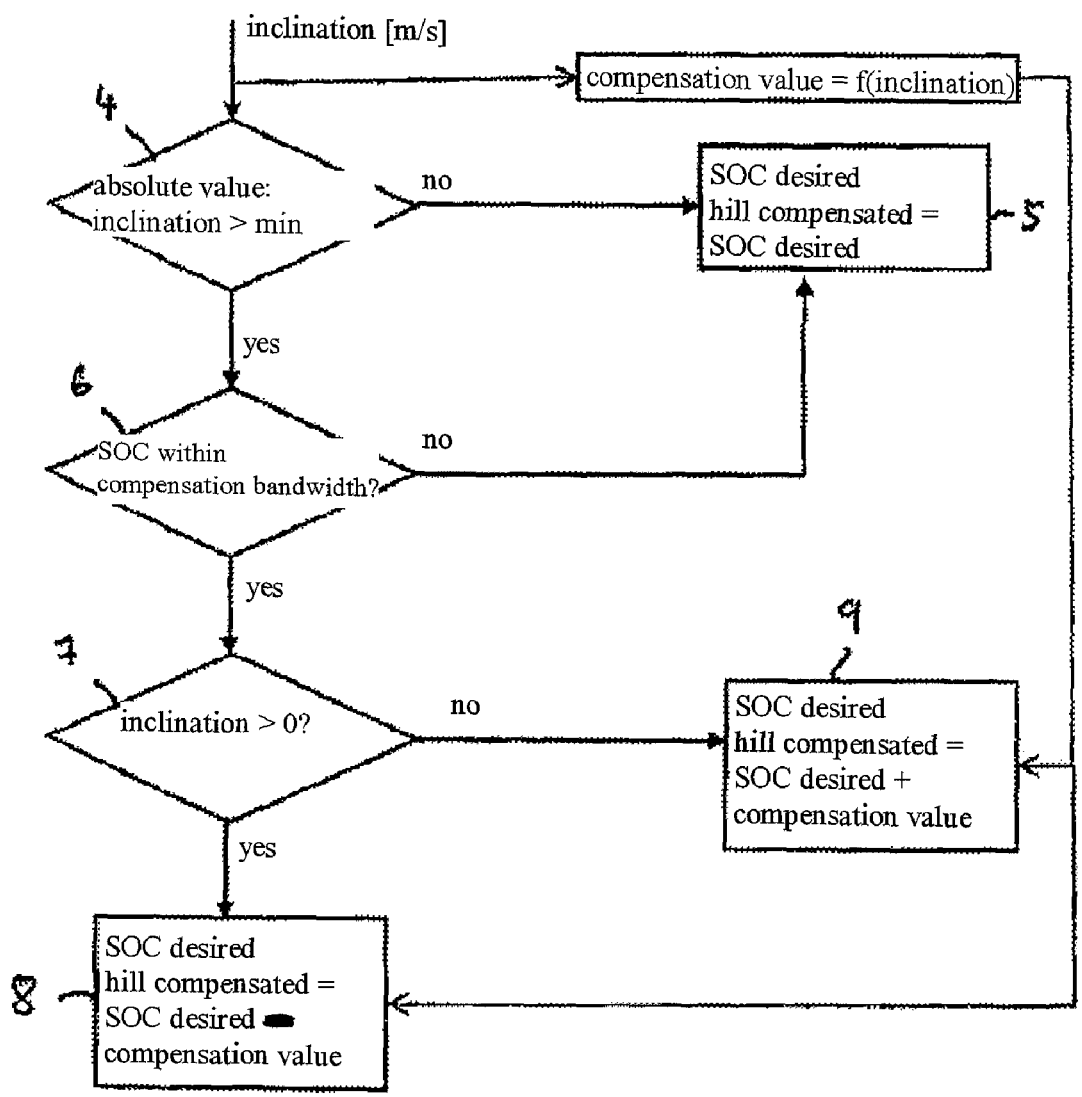
FIG. 2 is a flowchart illustrating the adjustment logic.

The logic of the desired state of charge adjustment is shown in detail in the flowchart depicted in FIG. 2. The step 4 checks, first of all, whether the upward slope of the traveled route exceeds a preset minimum inclination value. If this is not the case, then the desired state of charge is held, as indicated in block 5, at a preset "normal desired state of charge" that lies, for example, in a range between 50% and 70% of the maximum capacity of the energy accumulator. The normal desired state of charge can be set, for example, at a value of 60%.

If, on the other hand, the check in step 4 shows that the upward slope of the traveled route is greater than a preset inclination value, then step 6 checks whether the actual state of charge, which is referred to hereinafter as the "actual state of charge," lies within a "compensation bandwidth" that is defined by a lower state of charge limit and an upper state of charge limit. The lower state of charge limit can be set, for example, to a value of 40%, and the upper state of charge limit can be set to a value of 70% of the maximum capacity of the electric energy accumulator of the vehicle. If the actual state of charge of the electric energy accumulator drops below or exceeds the compensation bandwidth, then block 5 does not change the desired state of charge, in other words, the desired state of charge is held at the preset normal desired state of charge of, for example, 60%.

If, in contrast, the actual state of charge lies within the compensation bandwidth, then step 7 checks whether the condition for a vehicle traveling uphill or downhill is met. If the condition for a vehicle traveling uphill is met, then a desired state of charge is set that is derived from the normal desired state of charge (for example, 60%) minus a compensation value. The compensation value in turn is a function of the difference between two signals derived from the altitude signal and/or inclination signal.

If, on the other hand, the vehicle is traveling down a slope, then a desired state of charge is determined that is derived from the normal desired state of charge (for example, 60%) minus a compensation value that is also derived from the above described difference between two filtered signals derived from the altitude signal and/or inclination signal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adjusting a preset desired state of charge of an electric energy accumulator of a hybrid vehicle, the method comprising the acts of:
   determining, according to a preset decision logic, whether a condition for a vehicle traveling uphill or downhill is met;
   determining whether an actual state of charge of the energy accumulator lies within a preset range of the state of charge; and
   adjusting the desired state of charge according to a preset adjustment logic, if
      (i) the condition for the vehicle traveling uphill or downhill is met, and
      (ii) the actual state of charge of the energy accumulator lies within the preset range of the state of charge,
   wherein the act of adjusting the desired state of charge comprises the act of decreasing the desired state of charge if the condition for the vehicle traveling uphill is met.

2. The method according to claim 1, wherein the act of adjusting the desired state of charge comprises the act of increasing the desired state of charge if the condition for the vehicle traveling downhill is met.

3. The method according to claim 1, wherein a gradient of the at least one of an increase and a decrease in the desired state of charge is selected in terms of amount to be larger, the greater the downward slope and/or the inclination of a road last traveled by the vehicle.

4. The method according to claim 1, wherein the act of determining whether the condition for the vehicle traveling uphill or downhill is met comprises the act of evaluating by the decision logic at least one of an absolute or relative altitude signal and an inclination signal.

5. The method according to claim 4, wherein the at least one of the absolute or relative altitude signal and the inclination signal is determined by at least one of:
   measuring the ambient air pressure,
   evaluating an altitude signal of a navigation system,
   a drive torque,
   evaluating a vehicle acceleration, and
   evaluating an inclination of the vehicle in relation to a horizontal plane.

6. The method according to claim 4, wherein the at least one of the absolute or relative altitude signal and the inclination signal generate:
   a first signal, which reflects the time-based or distance-based changes in at least one of the altitude and the inclination in no more than a minimally filtered manner;
   a second signal, which reflects the time-based or distance-based changes in a more filtered manner relative to the first signal; and
   a detection of the condition for the vehicle traveling uphill and/or downhill if an amount of a difference between the first and second signals exceeds a preset value.

7. The method according to claim 5, wherein the at least one of the absolute or relative altitude signal and the inclination signal generate:
   a first signal, which reflects the time-based or distance-based changes in at least one of the altitude and the inclination in no more than a minimally filtered manner;
   a second signal, which reflects the time-based or distance-based changes in a more filtered manner relative to the first signal; and
   a detection of the condition for the vehicle traveling uphill and/or downhill if an amount of a difference between the first and second signals exceeds a preset value.

8. The method according to claim 6, wherein the desired state of charge is at least one of increased and decreased as a function of said amount of the difference between the first and second signals.

9. The method according to claim 7, wherein the desired state of charge is at least one of increased and decreased as a function of said amount of the difference between the first and second signals.

10. A method for controlling an actual state of charge of an electric energy accumulator of a hybrid vehicle, the method comprising the acts of:
   presetting a desired state of charge as a reference value;
   determining the desired state of charge in accordance with the following:
      determining, according to a preset decision logic, whether a condition for a vehicle traveling uphill or downhill is met;
      determining whether an actual state of charge of the energy accumulator lies within a preset range of the state of charge; and
      adjusting the desired state of charge according to a preset adjustment logic, if
         (i) the condition for the vehicle traveling uphill or downhill is met, and
         (ii) the actual state of charge of the energy accumulator lies within the preset range of the state of charge,
      wherein the act of adjusting the desired state of charge comprises the act of decreasing the desired state of charge if the condition for the vehicle traveling uphill is met.

11. The method according to claim 10, wherein the act of adjusting the desired state of charge comprises the act of increasing the desired state of charge if the condition for the vehicle traveling downhill is met.

12. The method according to claim 10, wherein the act of determining whether the condition for the vehicle traveling uphill or downhill is met comprises the act of evaluating by the decision logic at least one of an absolute or relative altitude signal and an inclination signal.

13. The method according to claim 12, wherein the at least one of the absolute or relative altitude signal and the inclination signal is determined by at least one of:
   measuring the ambient air pressure,
   evaluating an altitude signal of a navigation system,
   a drive torque,
   evaluating a vehicle acceleration, and
   evaluating an inclination of the vehicle in relation to a horizontal plane.

14. The method according to claim 12, wherein the at least one of the absolute or relative altitude signal and the inclination signal generate:
   a first signal, which reflects the time-based or distance-based changes in at least one of the altitude and the inclination in no more than a minimally filtered manner;

a second signal, which reflects the time-based or distance-based changes in a more filtered manner relative to the first signal; and a detection of the condition for the vehicle traveling uphill and/or downhill if an amount of a difference between the first and second signals exceeds a preset value.

15. The method according to claim 14, wherein the desired state of charge is at least one of increased and decreased as a function of said amount of the difference between the first and second signals.

* * * * *